Aug. 16, 1960  F. Y. CARTER  2,949,128
VALVE
Filed Dec. 10, 1956
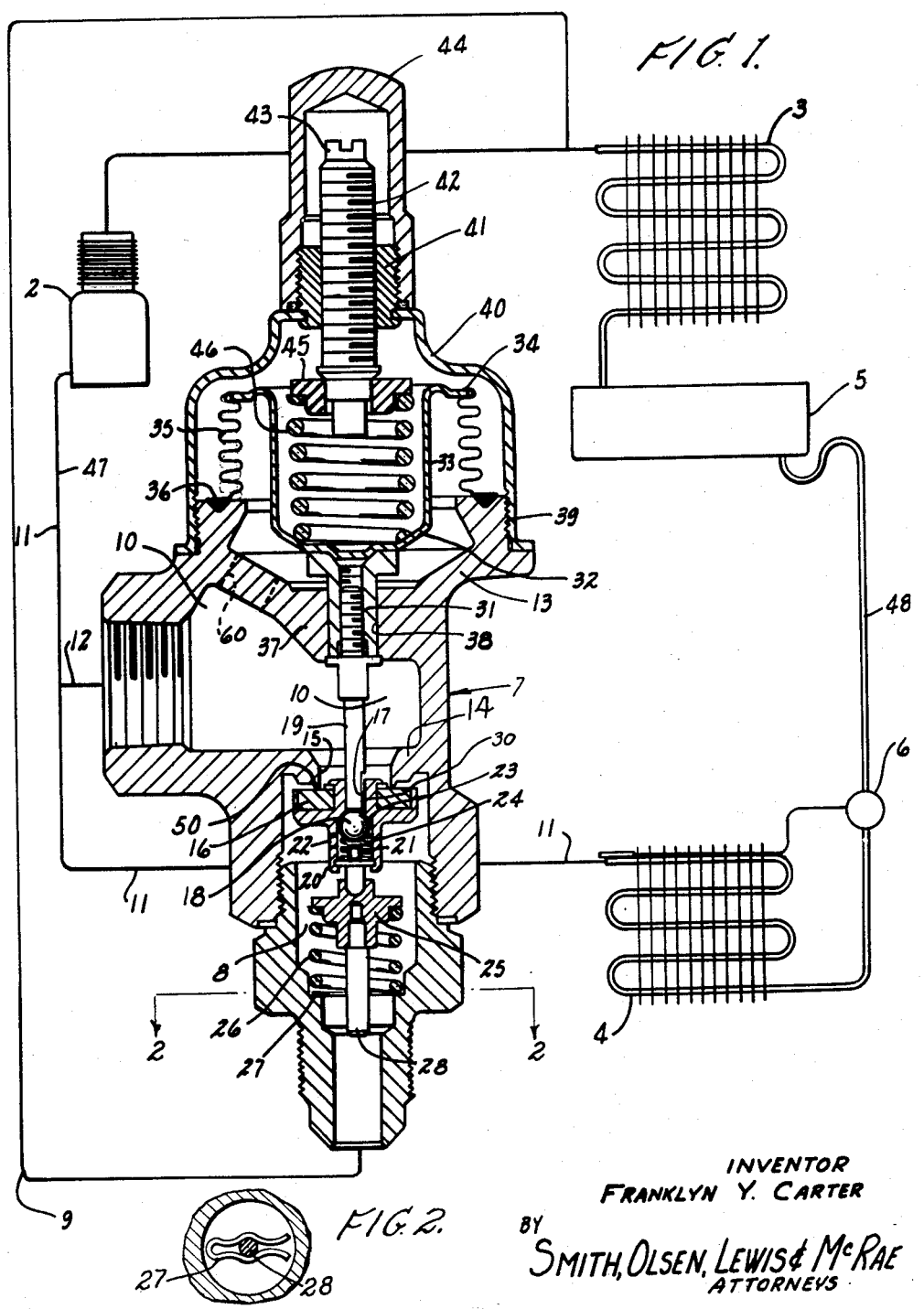
INVENTOR
FRANKLYN Y. CARTER
BY
SMITH, OLSEN, LEWIS & McRAE
ATTORNEYS United States Patent Office 2,949,128
Patented Aug. 16, 1960

2,949,128
VALVE

Franklyn Young Carter, Dearborn, Mich., assignor, by mesne assignments, to American Radiator & Standard Sanitary Corporation, New York, N.Y., a corporation of Delaware Filed Dec. 10, 1956, Ser. No. 627,225

1 Claim. (Cl. 137—505.37)

This invention relates to valves and particularly to means for preventing whistle and chatter in valves during their opening and closing movements. One application of the invention is in valves for controlling flow of refrigerant in automobile air conditioning systems.

In automobile air conditioning systems the compressor is usually driven in some manner from the automobile engine, either directly or through a clutch. The engine speed will vary from 400 r.p.m. at idle to as much as 4400 r.p.m. in some automobiles at high speed. Tests indicate that the capacity increase of the compressor with automobile speed increase causes a wide variation in cooling power at different automobile speeds. Therefore, if the automobile air conditioning system is large enough to cool the automobile at 20 m.p.h. it will over-cool the car at high speeds. Likewise, if the air conditioning system is suitable at 60 m.p.h. it will not cool the automobile at 20 m.p.h. There has therefore been proposed to use a capacity control at higher engine speeds to prevent over-cooling. This capacity control takes the form of a by-pass valve connected between the condenser and the suction line leading from the evaporator to the compressor. This by-pass valve opens and closes in accordance with changes in pressure in the suction line so as to discharge refrigerant into the suction line at high engine speeds. In this manner the pressure in the evaporator is higher than it would otherwise be at high engine speeds, and the amount of refrigerant discharged from the expansion valve into the evaporator at high engine speeds is thereby reduced as compared with the amount which would be discharged without the use of the by-pass valve. This system of capacity control prevents over-cooling and evaporator icing at high engine speeds.

It has been found that the port-closing element in the by-pass valve is subject to chattering and whistling during its opening and closing movements. Accordingly, it is an object of the present invention to provide mechanism for preventing this whistling and chattering without interfering with desired functioning of the valve.

Other objects of this invention will appear in the following description and appended claims, reference being had to the accompanying drawings forming a part of this specification wherein like reference characters designate corresponding parts in the several views.

In the drawings:

Figure 1 is a diagrammatic view of a conventional automobile air conditioning system with the by-pass valve of the present invention shown in section.

Fig. 2 is a sectional view on line 2—2 in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseolgy or terminology employed herein is for the purpose of description and not of limitation.

In the drawings there is shown an automobile air conditioning system including an automobile engine-driven compressor 2, a condenser 3, an evaporator 4, a receiver 5, an expansion valve 6 and a by-pass valve 7. Inlet chamber 8 of valve 7 is connected to the first coil of the condenser through a line 9. Outlet chamber 10 of valve 7 is connected to suction line 11 through line 12.

Valve 7 includes a housing 13 having an internal wall 14 apertured to provide a port 15 between inlet chamber 8 and outlet chamber 10. A valve element 16 is positioned upstream from port 15 so as to close it and prevent fluid flow through the valve housing 13. Valve element 16 is provided with a central opening 17. A second valve element in the form of a ball 18 is movably positioned on the upstream side of opening 17 so as to close said opening when thrust element 19 is in the "up" position. Valve element 16 carries a cylindrical cage 20 which is closed at its lower end by means of a flanged abutment pin 21. Openings 22 are provided in cage 20 to permit fluid flow from inlet chamber 8 past ball 18 and through opening 17. The spacing between pin element 21 and shoulder 23 formed at the lower end of opening 17 is such that ball element 18 has a limited movement away from opening 17. A spring 24 is provided for insuring positive closing of ball 18 against shoulder 23 when thrust element 19 is moved up sufficiently in opening 17.

The lower end of pin element 21 has fixedly secured thereto a spring-sealing member 25 which engages a compression coil spring 26. The lower end of spring 26 engages a "hair pin" wire 27 which has limited frictional engagement with a pin 28 fixedly carried by member 25. The frictional drag between wire 27 and pin 28 tends to help prevent chatter caused by opening and closing of valve element 16. However this action of mechanisms 27 and 28 does not entirely eliminate chattering and whistling, and it is therefore proposed under the present invention to provide a further anti-chattering, anti-whistling, action by the mechanism of ball 18 and opening 17.

Thrust element 19 has a fairly close sliding fit in opening 17 except along its surface 30 which is flattened to provide a recess for the upward flow of fluid from chamber 18, past shoulder 23, through opening 17 and into outlet chamber 10. It is contemplated that other surface configurations could be applied to element 19 to provide the necessary clearance space for flow of fluid through opening 17. The upper end of element 19 is threaded into a collar element 31 which is fixedly secured on the end wall 32 of a cup-shaped wall element 33. Cup element 33 is provided at its mouth with a flange 34 to which is fixedly secured a flexible bellows 35. The lower end of bellows 35 is fixedly secured at 36 to housing 13. Extending from housing 13 into outlet chamber 10 is a wall 37 which is provided with an aperture 38 for the slidable guiding of a collar element 31 which adjustably carries thrust element 19. An opening 60 is provided through wall 37 to expose bellows 35 and cup element 33 to the fluid pressure in chamber 10.

The upper end of housing 13 is threaded as at 39 for reception of a cap element 40. The cap element serves to fixedly retain a nut 41 which is interiorly threaded for reception of an adjusting screw 42 having a screw driver slot 43. A cover element 44 is threaded onto a nut 41 to prevent tampering with screw 42 after it has been adjusted in nut 41. The lower end of screw 42 is rotatably journalled in a spring-seating member 45, and a yieldable means in the form of a compression coil spring 46 is positioned between member 45 and end wall 32 of cup element 33.

The construction of valve 7 is such that when the pressure in outlet chamber 10 is relatively low the valve element 16 is in its illustrated closed position. The design of system 1 is such that low pressures in chamber 10 are obtained at high automobile engine speeds. Thus, at low engine speeds compressor 2 draws in comparatively small amounts of fluid from line 11, and the fluid pressure in line 12 is therefore comparatively high, as for example in the neighborhood of 25 p.s.i. As the automobile engine increases its speed compressor 2 draws in greater quantities of refrigerant from line 11, and the pressure in line 12 is therefore decreased, as for example to a value in the neighborhood of 22 p.s.i. As the pressure in outlet chamber 10 decreases valve element 16 is caused to be opened so as to allow refrigerant from line 9 to flow through chambers 8 and 10 into line 12 and then into section 47 of line 11. Flow of refrigerant from line 12 into section 47 reduces the quantity of refrigerant taken from evaporator 4 and thereby maintains a relatively high pressure in the evaporator which acts against the high refrigerant pressure in line 48 to prevent excessive discharge of refrigerant through expansion valve 6 when the automobile engine is operating at high speeds. As a result, excess cooling and evaporator freezing are avoided at high engine speeds.

In operation of valve 7, the pressure in outlet chamber 10 exerts a downward unit pressure on valve element 16 and an upward unit pressure on cup member 32. The horizontal cross-sectional area of cup member 32 is greater than the cross-sectional area of valve element 16, and accordingly the resultant force component due to the fluid pressure in chamber 10 is in an upward direction. Spring 46 is designed to exert a downward force on cup member 33 in opposition to the upward force from the fluid in chamber 10, as well as the upward force due to the fluid in chamber 8. As a result any decrease in the pressure in chamber 10 is effective to allow spring 46 to move cup element 32 downwardly. Downward movement of cup element 32 causes thrust element 19 to move ball 18 downwardly against the abutment pin 21 so as to open opening 17. After ball 18 seats against abutment 21 continued downward movement of cup element 33 under the influence of spring 46 is effective to force valve element 16 away from port 15 so as to allow fluid from chamber 8 to flow around valve element 16, through port 15 and into chamber 10.

When the fluid pressure in chamber 10 is caused to be increased (as when the compressor draws in comparatively small quantities of refrigerant from line 11 during operation of the automobile engine at low speeds) the resultant upward force component due to the outlet chamber fluid pressure is accordingly increased in a sufficient amount to cooperate with the pressure in chamber 8 for overcoming the downward force of spring 46 so as to effect an upward movement of cup element 32. During the initial stage of this upward cup element movement thrust element 19 moves upwardly so as to permit valve element 16 to close port 15. During this initial stage the fluid pressure in chamber 8 is effective on valve element 16 to maintain abutment pin 21 against ball 18 in such manner that fluid is allowed to flow through opening 17. However, when valve element 16 seats against port-forming annular lip 50 further upward movement of thrust element 19 allows spring 24 and the fluid pressure in chamber 8 to force ball 18 against shoulder 23 so as to close opening 17 and prevent fluid flow into chamber 10.

It should be noted that during opening movement of the valve mechanism ball element 18 is caused to move away from shoulder 23 so as to open opening 17 before valve element 16 is caused to be moved away from annular lip 50. Also, during closing movement of the valve mechanism valve element 16 is caused to be closed against annular lip 50 before ball element 18 is allowed to close against annular shoulder 23. It has been found that by thus having opening 17 open during both closing and opening movement of valve element 16 there is no whistling or chattering caused by an abrupt throttling of the fluid flow as would take place if opening 17 and ball 18 were not present. The anti-whistling and anti-chattering structure provided by valve element 18 and opening 17 is considered a primary feature of the present invention.

Having thus described my invention, I claim:

A valve comprising a valve housing defining an inlet chamber, outlet chamber, and main port therebetween; a main valve element on the upstream side of said port for controlling main flow therethrough; a bleed opening through said main valve element; a cage structure carried by said valve element and defining an abutment surface in registry with said bleed opening; an auxiliary valve element floatably positioned within said cage structure for movement between the abutment surface and bleed opening; wall element means exposed and responsive to outlet chamber pressure variations for fluctuating movement; thrust means extending from said wall element means through the bleed opening into releasable contact with the auxiliary valve element; a relatively light compression spring means acting within the cage structure on the auxiliary valve element to maintain it in operative engagement with the thrust means; a relatively heavy spring means acting on the wall element means in opposition to the outlet chamber pressure for moving the auxiliary valve element to an open position against the abutment surface, and thereafter operating through the cage structure to open the main valve element; and a third spring means of intermediate effective force seated in the inlet chamber and operatively engaging the main valve element whereby to maintain the main valve element in operative relation to the thrust means; reverse movement of said wall element means by increasing outlet chamber pressure serving to initially close the main valve against the main port and thereafter close the auxiliary valve element against the bleed opening.

References Cited in the file of this patent

UNITED STATES PATENTS

| | | |
|---|---|---|
| 650,725 | Metzger | May 29, 1900 |
| 844,946 | Lowe | Feb. 19, 1907 |
| 2,197,454 | Smith | Apr. 16, 1940 |
| 2,213,488 | Dowrick | Sept. 3, 1940 |
| 2,301,031 | Ferguson | Nov. 3, 1942 |
| 2,370,182 | Morrow | Feb. 27, 1945 |
| 2,508,064 | Hazard | May 16, 1950 |
| 2,526,069 | Douglas | Oct. 17, 1950 |
| 2,557,378 | Granberg | June 19, 1951 |
| 2,645,884 | Kellie | July 21, 1953 |